United States Patent [19]

Suganuma et al.

[11] Patent Number: 5,417,734
[45] Date of Patent: May 23, 1995

[54] METHOD OF PRODUCING OPTICAL FIBER COUPLERS USING RECTIFIER RODS TO PROVIDE EVEN HEAT DISTRIBUTION

[75] Inventors: Hiroshi Suganuma; Tomoyuki Hattori; Hiroaki Takimoto; Eisuke Sasaoka; Hiroshi Yokota; Kenichi Matsushita, all of Kanagawa, Japan

[73] Assignee: Sumitomo Electric Industries, Ltd., Osaka, Japan

[21] Appl. No.: 145,509

[22] Filed: Nov. 4, 1993

[30] Foreign Application Priority Data

Nov. 5, 1992 [JP] Japan .................................. 4-321323
Nov. 5, 1992 [JP] Japan .................................. 4-321324

[51] Int. Cl.⁶ .................................. G02B 6/287
[52] U.S. Cl. .................................. 65/408; 65/411; 65/435
[58] Field of Search .................. 65/4.1, 4.21, 4.3, 11.1, 65/406, 408, 410, 411, 435

[56] References Cited

U.S. PATENT DOCUMENTS

| | | | |
|---|---|---|---|
| 4,028,162 | 6/1977 | Cherin | 65/4.21 |
| 4,345,137 | 8/1982 | Mignien | 65/4.21 |
| 4,725,297 | 2/1988 | Grigsby | 65/11.1 |
| 4,869,570 | 9/1989 | Yokohama et al. | 350/96.15 |
| 5,167,685 | 12/1992 | Fukuma | 65/4.21 |
| 5,205,851 | 4/1993 | Suganuma | 65/11.1 |

FOREIGN PATENT DOCUMENTS

| | | |
|---|---|---|
| 0350900 | 1/1990 | European Pat. Off. |
| 145521 | 7/1986 | Japan ............... 65/4.3 |
| 63-205615 | 8/1988 | Japan. |
| 1120510 | 3/1989 | Japan. |
| 2204145 | 11/1988 | United Kingdom. |

Primary Examiner—W. Gary Jones
Assistant Examiner—John M. Hoffmann
Attorney, Agent, or Firm—Cushman Darby & Cushman

[57] ABSTRACT

Optical fibers are fixed to elongating tables by optical fiber fixing jigs. Coatings are removed from portions of the fibers and respective fibers of two different groups are placed into tight contact with one another. Rectifier rods, supported movably by rectifier rod supporting members, are disposed outside the optical fiber strands. The fibers are then heated by a gas burner 4A so as to be welded integrally with each other, and are then elongated. By using rectifier rods, the outside optical fiber strands of the groups being welded are not so strongly heated that uniform welding and elongation can be realized. In one preferred embodiment, the fibers are arranged such that there are gaps therebetween. These gaps are substantially 250 μm. The gaps are sufficiently wide that heating gas flows in a manner such that all the optical fiber strands are heated uniformly to make it possible uniform welding and elongation.

14 Claims, 6 Drawing Sheets

METHOD OF PRODUCING OPTICAL FIBER COUPLERS USING RECTIFIER RODS TO PROVIDE EVEN HEAT DISTRIBUTION

BACKGROUND OF THE INVENTION

1. Field of Invention

The present invention relates to the production of optical fiber couplers. More specifically, it addresses the problem of producing a plurality of optical fiber couplers at the same time that all have the same operating characteristics.

2. Description of Related Art

Generally, an optical fiber coupler is produced by carrying out the following manufacturing steps: 1) removing the coating from plurality of optical fibers, 2) heating and welding the optical fibers integrally so that the optical fibers are tightly in contact with each other, and 3) further heating and extending them. The strands of optical fibers are minute glass bodies each having an outer diameter of 125 μm. Therefore, high accuracy is required to produce an optical fiber coupler. Therefore, the productivity of optical fiber couplers has been so low that the optical fiber couplers have been expensive to produce.

To improve productivity, there has been proposed a method of producing a plurality of optical fiber couplers at the same time, as disclosed in Japanese Patent Unexamined Publication No. Sho. 63-205615, or Japanese Patent Unexamined Publication No. Hei. 1-120510, the subject matter of which are incorporated herein by reference as if fully recited.

When producing a plurality of optical fiber couplers en bloc, it is required that all of the couplers have the same operating characteristics. However, using conventional production methods, it has been difficult to manufacture couplers with good reproducibility while making their characteristics uniform.

Figure 7:
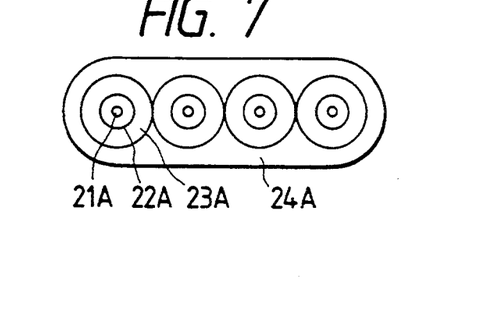
FIG. 7 is a sectional view of an example of a tape-like four core optical fiber unit.
Figure 16:
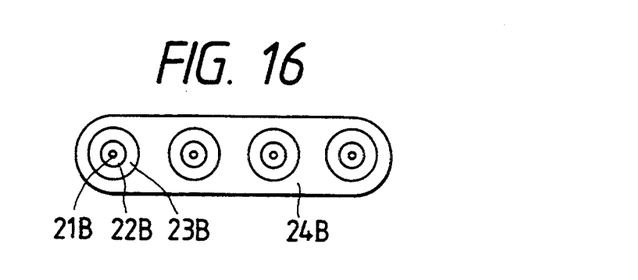
FIG. 16 is a sectional view of an example of a tape-like four-core optical fiber unit used in an embodiment of the present invention.

Optical fiber couplers produced simultaneously by conventional methods were measured as to their degrees of coupling. Their characteristics turned out to be non-uniform. It was difficult to simultaneously produce optical fiber couplers which exhibited the same degree of coupling. To learn more, four optical fiber couplers were produced from tape-like four-core optical fiber units and their structures were inspected in detail. FIG. 7 shows a section of an example of a tape-like four-core optical fiber unit. Another example of a tape-like four core optical fiber unit is shown in FIG. 16, where the individual optical fibers are spaced from each other. As shown in FIG. 7, each unit is constituted by four optical fibers or strands. Each optical fiber strand has a core 21A and a clad 22A and covered with a protective coating 23A. The optical fiber strands are arranged in a plane and covered with a coating layer 24A so as to be integrated flatly.

Figure 8:
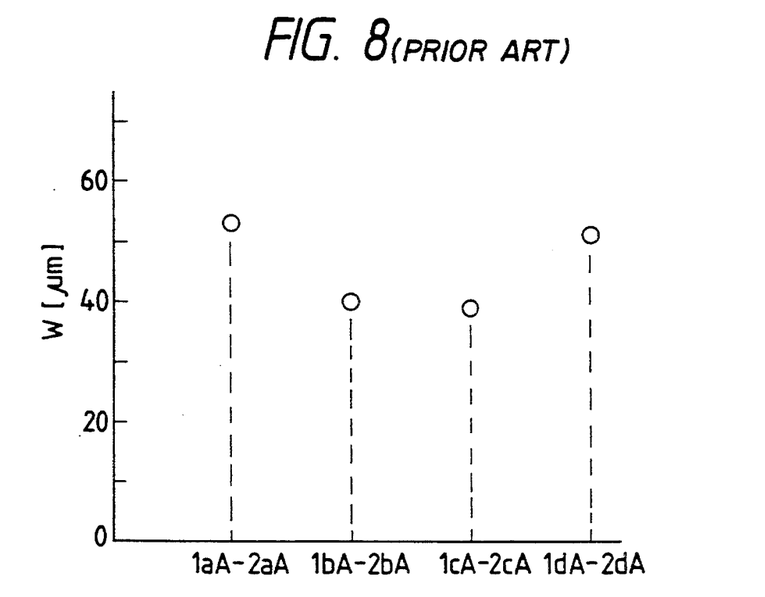
FIG. 8 is an explanatory diagram illustrating the quantity of welding according to a conventional welding method.
Figure 9:
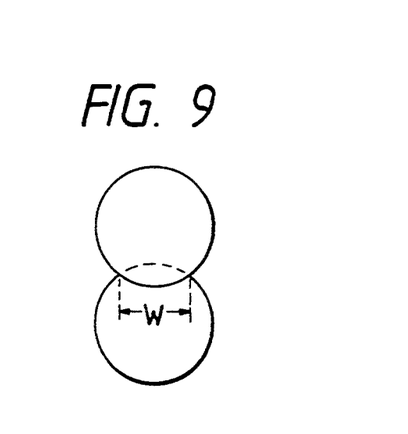
FIG. 9 is an explanatory diagram of the quantity of welding.

When optical fiber couplers were manufactured from such units using conventional methods, it was found that the quantity of welding varied on a large scale, as shown in FIG. 8. In FIG. 8, the abscissa designates optical fiber strands of tape-like four-core optical fiber units in the order sequentially from the outer side, and the ordinate designates the quantity of welding between the respective optical fiber strands. The quantity of welding was expressed by the width W of a welded portion between two strands, as shown in FIG. 9. The variation of the quantity of welding was larger in the outer side strands than in the inner side strands, as seen in FIG. 8. From this result, it was concluded that the optical fiber strands were not heated uniformly since the quantity of welding depends largely on the temperature of the optical fiber strands which are being heated.

From further detailed inspection, it was determined that there was a problem in the flow of gas at the time of heating the optical fiber strands. The distance between optical fiber strands after removal of the protective coatings of a tape-like optical fiber unit is so narrow (about 125 μm) that heating gas cannot flow between the optical fiber strands satisfactorily. It is impossible to heat all the optical fiber strands uniformly.

Figure 5:
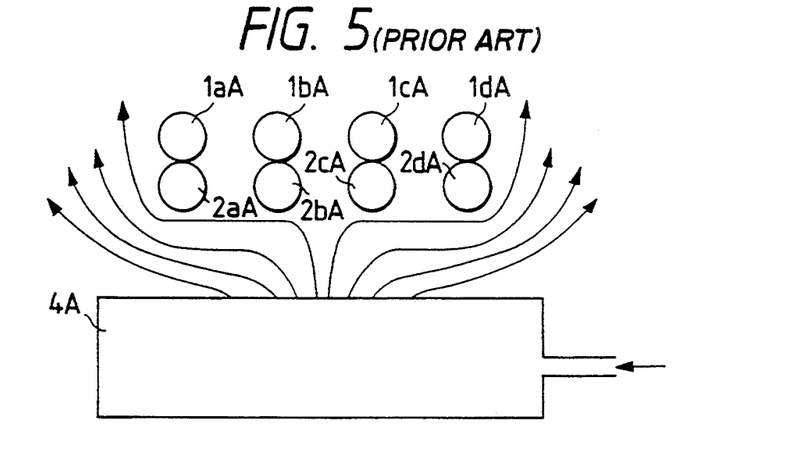
FIG. 5 is an explanatory diagram of the state of heating in a conventional production method.

The heating process is further explained with reference to FIG. 5. Reference numerals 1aA, 1bA, 1cA and 1dA represent optical fiber strands of one tape-like optical fiber unit, 2aA, 2bA, 2cA and 2dA optical fiber strands of the other tape-like optical fiber unit, and 4A a gas burner. Each of the pairs of the corresponding optical fiber strands 1aA and 2aA, 1bA and 2bA, 1cA and 2cA, and 1dA and 2dA are made to contact tightly with each other, heated and welded by the gas burner 4A. When heating, gas does not flow into portions between the optical fiber strands satisfactorily. Mostly, it flows outside (around) all of the strands.

Therefore, the flow of gas strongly heats only the optical fiber strands which are disposed on the opposite ends, so that the heating temperature of the outer side optical fiber strands is higher than that of the inner side optical fiber strands, and the quantity of welding of the outer side optical fiber strands is larger than that of the inner optical fiber strands. This phenomenon is not limited to the case of using tape-like optical fiber units. In the case of tightly contacting and arranging single-core optical fibers, the distance between optical fiber strands is also about 125 μm in the same manner to thereby bring about such a phenomenon.

SUMMARY OF THE INVENTION

The present invention has been motivated by the foregoing problem. It is an object of the present invention to provide a method of producing a plurality of optical fiber couplers having uniform characteristics at the same time.

Generally, the following manufacturing steps are carried out. The coating is removed from a plurality of optical fibers constituting a first optical fiber group. The coating is removed over a predetermined section in the same position in the longitudinal direction to expose optical fiber strands. The exposed optical fiber strands are arranged so as to be parallel to each other in the same plane so as to form the first optical fiber group. A second optical fiber group is constituted by optical fibers, the number of which is the same as that of the first optical fiber group. Coating removal and arrangement are performed in the same manner as in the first optical fiber group to form the second optical fiber group. The optical fiber strands of the first optical fiber group are made to be in tight contact with respectively corresponding optical fiber strands of the second optical fiber group. Rod members are arranged outside the optical fiber groups in rows. The first and second optical fiber groups are heated and welded with each other en bloc using a gas burner. Thereafter, the welded portions are heated and elongated to simultaneously produce a plurality of optical fiber couplers.

According to another aspect of the invention, the exposed optical fiber strands of both the first and second groups that are arranged so as to be parallel to each other in the same plane are also arranged so as to have gaps therebetween. The gaps permit a heating gas to flow uniformly through the gaps and around the fiber strands. The optical fiber strands of the first optical fiber group are made to be in contact tightly with respectively corresponding optical fiber strands of the second optical fiber group. The first and second optical fiber groups are heated and welded with each other en bloc using a gas burner. Thereafter, the welded portions are heated and elongated to simultaneously produce a plurality of optical fiber couplers.

In one preferred embodiment, each of the gaps between the optical fiber strands is selected to be not smaller than 250 μm. In another preferred embodiment, each of the gaps between alternate optical fiber strands is selected to be not smaller than 250 μm.

According to another aspect of the invention, at least one of the first and second optical fiber groups is constituted by a tape-like multi-core optical fiber unit (ribbon fiber) in which a plurality of optical fibers are formed integrally with a protective coating surrounding them. In one preferred arrangement, the tape-like multi-core optical fiber unit (ribbon fiber) is formed so that gaps between the optical fiber strands are not smaller than 250 μm. The rod members are arranged on the outside during heating and elongating operation, as well as during welding.

DETAILED DESCRIPTION OF THE PREFERRED EMBODIMENTS

Figure 1:
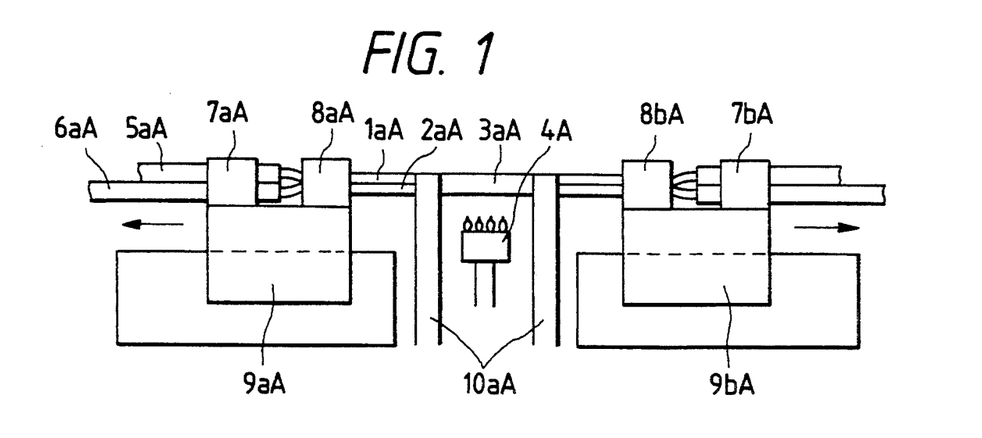
FIG. 1 is a side view schematic diagram of an apparatus for producing optical fiber couplers, for use in an embodiment of the method of producing optical fiber couplers according to the present invention.
Figure 2:
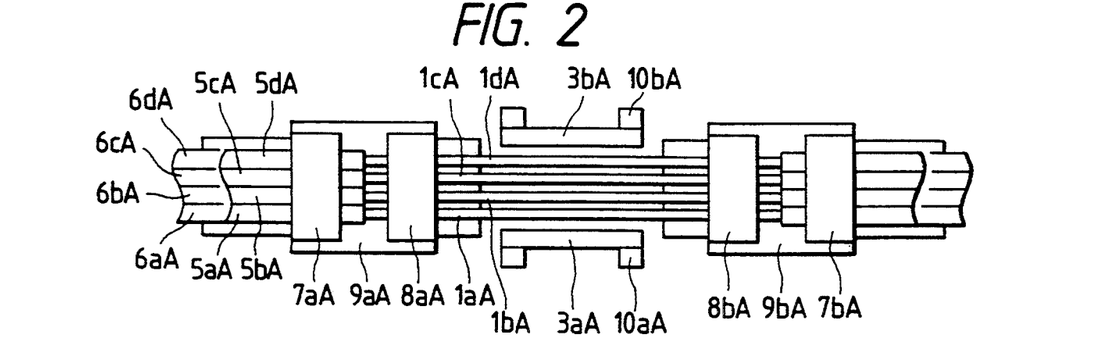
FIG. 2 is a plan view schematic diagram of an apparatus for producing optical fiber couplers, for use in an embodiment of the method of producing optical fiber couplers according to the present invention.

FIGS. 1 and 2 are respectively side and plan views of a schematic arrangement diagram of an apparatus for producing optical fiber couplers various of the claimed methods utilize apparatus as shown in FIGS. 1 and 2. Reference numerals $1aA$ to $1dA$ and $2aA$ to $2dA$ represent optical fiber strands, $3aA$ and $3bA$ rectifier rods, $4A$ a gas burner, $5aA$ to $5dA$ and $6aA$ to $6dA$ optical fibers, $7aA$ and $7bA$ optical fiber fixing jigs, $8aA$ and $8bA$ optical fiber strand fixing jigs, $9aA$ and $9bA$ elongating tables, and $10aA$ and $10bA$ rectifier rods supporting members. The optical fiber strands $2aA$ to $2dA$ are disposed under the optical fiber strands $1aA$ to $1dA$ so that they are not shown in FIG. 2.

The first and second optical fibers $5aA$ to $5dA$ and $6aA$ to $6dA$ are fixed, by the optical fiber fixing jigs $7aA$ and $7bA$, to the elongating tables $9aA$ and $9bA$ and held in position such that they are parallel and in tight contact with each other. Further, the optical fiber strands $1aA$ to $1dA$ obtained by removing the coating of the first optical fibers and the optical fiber strands $2aA$ to $2dA$ obtained by removing the coatings of the second optical fibers are fixed, by the optical fiber strand fixing jigs $8aA$ and $8bA$, so as to be in tight contact with each other. Further, the rectifier rods $3aA$ and $3bA$ supported movably by the rectifier rod supporting members $10aA$ and $10bA$ are disposed in predetermined positions outside the optical fiber strands $1aA$ to $1dA$ and $2aA$ to $2dA$.

In this state, the optical fiber strands $1aA$ to $1dA$ and $2aA$ to $2dA$ are heated by use of the gas burner $4A$ so that $1aA$ and $2aA$, $1bA$ and $2bA$, $1cA$ and $2cA$, and $1dA$ and $2dA$ are welded integrally with each other, respectively. Thereafter, the integrated optical fiber strands $1aA$ and $2aA$, $1bA$ and $2bA$, $1cA$ and $2cA$, and $1dA$ and $2dA$ are heated by use of the gas burner $4A$ and the rectifier rods $3aA$ and $3bA$ are removed, and the elongating table $9aA$ is moved left while the elongating table $9bA$ is moved right to thereby perform elongation. At this time, a laser diode (LD) light source, not shown in the drawings, is connected to one end of the optical fiber $5aA$ while power meters are connected to the other-side ends of the optical fibers $5aA$ and $6aA$ to thereby monitor light propagating through the fibers. The elongating operation is stopped when the intensities of light emitted from the optical fibers $5aA$ and $6aA$ become equal to each other. Thus, it is possible to simultaneously produce four optical couplers having uniform characteristics.

Figure 3:
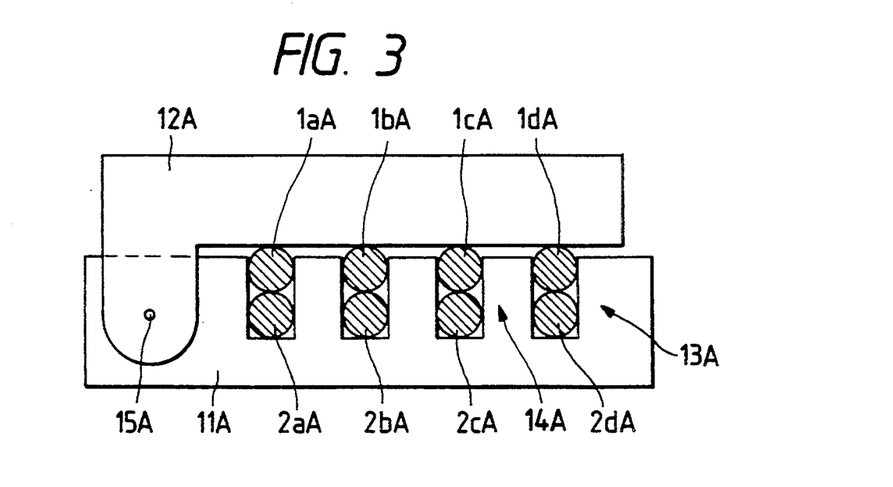
FIG. 3 is a front view schematically illustrating an optical fiber strand fixing jig.

FIG. 3 is a front schematic diagram of the structure of an optical fiber strand fixing jig. Reference numeral $11A$ represents a body member $12A$ a pressing member, 13A groove portions, 14A spacer portions, and 15A a pivot. The optical fiber strands 1aA to 1dA and 2aA to 2dA accommodated in the groove portions 13A are shown in section. The groove portions 13A in the body member 11A are formed with distances so that the protective coatings of the optical fibers can contact. Accordingly, the optical fiber strands are fixed in parallel by the optical fiber strand fixing jig 8aA or 8bA. The optical fibers 5aA to 5dA are fixed with their protective coatings in contact with each other in the optical fiber fixing jig 7aA or 7bA as described in FIG. 1. For example, if the outer diameter of each of optical fiber protective coatings is 250 μm, and the diameter of each of the optical fiber strands is 125 μm, the width of each of the groove portions 13A is selected to be 125 μm, and the width of each of the spacer portions 14A between the groove portions is selected to be 125 μm. The groove portions 13A may be formed by cutting the body member 11A, or the spacer portions may be formed by burying piano wires in a upper surface of the body member 11A which is made plane. When two optical fiber strands are accommodated in each groove portion 13A, the pressing member 12A is turned down around on the pivot 15A so as to press and fix the optical fiber strands from the upside.

Figure 4:
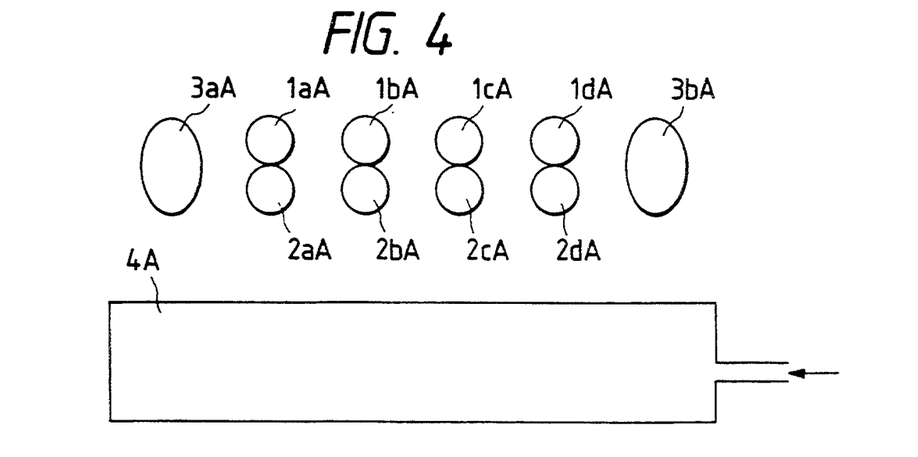
FIG. 4 is an explanatory diagram illustrating the arrangement of the rectifier rods in an embodiment of the present invention.

FIG. 4 shows an arrangement of rectifier rods. In this embodiment, circular quartz glass rods were used as the rectifier rods 3aA and 3bA. However, the material and shape of the rectifier rods are not limited to this embodiment. As the material of the rectifier rods, for example, desired materials, for example, ceramic materials such as alumina, zirconium, and so on, may be used instead of quartz glass. The sectional shape is not limited to a circular one, but preferably the section of each rectifier rod is formed of a curved line to make the flow of gas stable in order to obtain a stable rectifying effect.

Although the rectifier rods were used only at the time of welding and are removed during elongating, the heating may be carried out with the rectifier rods 3aA and 3bA being left as they are during elongating. In this way, more uniform heating can be carried out and it becomes possible to obtain more uniform characteristics of the optical fiber couplers.

In the present invention, as shown in FIG. 4, rod members 3aA and 3bA are disposed on both the outsides of the first and second optical fiber strands 1aA to 1dA and 2aA to 2dA and heating is carried out in this state. By disposing the rod members (hereinafter referred to as "rectifier rods") in such a manner, the flow of gas surrounding the optical fiber strands 1aA, 1dA, 2aA and 2dA at the end portions is made weak enough so that a plurality of optical fiber strands are heated uniformly. Thus, it is possible to obtain optical fiber couplers having the same characteristics.

The following describes a first embodiment of a method for producing optical fiber couplers using the apparatus shown in FIGS. 1 and 2. Single-mode (SM) optical fibers for 1.3 μm band communication were used as the optical fibers 5aA to 5dA and 6aA to 6dA. Quartz glass rods each having a diameter of 1.2 mmφ were used as the rectifier rods, and disposed in the positions 0.8 mm away from the outside optical fibers. During elongating (after welding), an LD light source of a wave length of 1.31 μm was used as a light source for monitoring the ratio of branching, and the elongating operation was stopped when the emitted light intensities became equal to each other, in the same manner as mentioned above. As a result of measuring the degree of coupling upon the obtained optical fiber couplers 1aA–2aA, 1bA–2bA, 1cA–2cA and 1dA–2dA on the basis of the wave length 1.31 μm, each optical fiber coupler had the degree of coupling of 50±2%, so that it was possible to produce optical fiber couplers having uniform characteristics.

The optical fibers are not limited to single-core optical fibers. Tape-like optical fiber units, such as shown in FIG. 7 and in FIG. 16, may be used as one or both of the optical fiber group 1aA to 1dA and the optical fiber group 2aA to 2dA.

In a second embodiment, first and second tape-like eight (8)—core optical fiber units were used as optical fibers so as to produce eight optical fiber couplers en bloc. That is, the optical fibers 5aA to 5dA and 6aA to 6dA of FIGS. 1 and 2 were replaced by coated optical fibers 5aA to 5hA and 6aA to 6hA of the tape-like optical fiber units (see FIGS. 17 and 18), and the optical fiber strands 1aA to 1dA and 2aA to 2dA of FIG. 1 were replaced by 1aA to 1hA and 2aA to 2hA. The coated optical fibers used in the tape-like optical fiber units were optical fibers designed for 1.3 μm band communication. After removing the coating from the first tape-like optical fiber unit, the eight optical fiber strands 1aA to 1hA each having an outer diameter of 125 μm were etched so as to reduce the outer diameter by use of a 10% fluoric acid solution so that the outer diameter becomes 115 μm. The optical fiber strands 2aA to 2hA of the second tape-like optical fiber unit were not etched so that they were left as they were in a condition where the coating was removed. These first and second tape-like optical fiber units were fixed in position using the optical fiber fixing jigs 7aA and 7bA, and the upper and lower optical fiber strands were tightly contacted and fixed by use of the optical fiber fixing jigs 8aA and 8bA. In this state, only the rectifier rod 3aA was set, and the optical fiber strands were heated by the gas burner 4A for 30 seconds, and further heated for 30 seconds in a condition that only the rectifier rod 3bA was set, so that the optical fiber strands were welded integrally.

Next, both of the rectifier rods 3aA and 3bA were set, and elongating was carried out by moving the elongating table 9aA left and the elongating table 9bA right while the integrated optical fiber strands 1aA to 1hA and 2aA to 2hA were heated using the gas burner 4A. At this time, an LD light source of a wave length of 1.31 μm was connected to one end of the optical fiber 5aA, an LD light source of a wave length of 1.55 μm was connected to one end of the optical fiber 5bA, and power meters were connected to the other-side ends of the optical fibers 5aA, 5bA, 6aA and 6bA respectively. The outputs of the power meters were measured, and the elongating operation was stopped when $$\frac{INT1}{INT1 + INT2} = \frac{INT3}{INT3 + INT4}$$

where INT1=the intensity of light emitted from the optical fiber 5aA; INT2=the intensity of light emitted from the optical fiber 6aA; INT3=the intensity of light emitted from the optical fiber 5bA; and INT4=the intensity of light emitted from the optical fiber 6bA.

The degree of coupling was measured upon the thus obtained eight optical fiber couplers 1aA–2aA, 1bA–2bA, 1cA–2cA, 1dA–2dA, 1eA–2eA, 1fA–2fA, 1gA–2gA and 1hA–2hA. Each optical fiber coupler had the degree of coupling 50±2% at the wave length of 1.31 μm, and also 50±2% at the wave length of 1.55

μm. Thus, it could be confirmed that they showed uniform characteristics in each wave length.

The optical fiber couplers produced in the second embodiment were wide band optical fiber couplers the degrees of coupling of which were equal with respect to the wave lengths 1.31 μm and 1.55 μm. Conventionally, in the elongating operation of such optical fiber couplers, it has been necessary to connect a plurality of light sources and photodetectors, by use of a combining/branching filter, to one optical fiber because elongating operation has been carried out while monitoring light at a plurality of wave lengths at the same time. An advantage of the production method according to the present invention, is that because optical fiber couplers having the same characteristics can be produced at the same time, the characteristics at a plurality of wave lengths can be monitored without using a combining/branching filter if only a pair of a light source and a photodetector are attached to a plurality of optical fibers.

The diameters of optical fiber strands of one of the optical fiber units were reduced by etching in order to make the degree of coupling of optical fiber couplers be wide band in the second embodiment. Alternatively, it is possible to apply other generally known methods, such as a method of using optical fibers having different strand diameters, a method of elongating one optical fiber group in advance, a method of using optical fibers having cores different in diameter, a method of using optical fibers having cores different in refractive index, and so on.

In a third embodiment, glass rods having a shape similar to optical fiber strands were used as rectifier rods. First, and second tape-like four-core optical fiber units were used as optical fibers to produce four optical fiber couplers en bloc. Each of the coated optical fibers in each tape-like optical fiber unit was an SM optical fiber having cut-off of 0.75 μm.

Figure 6:
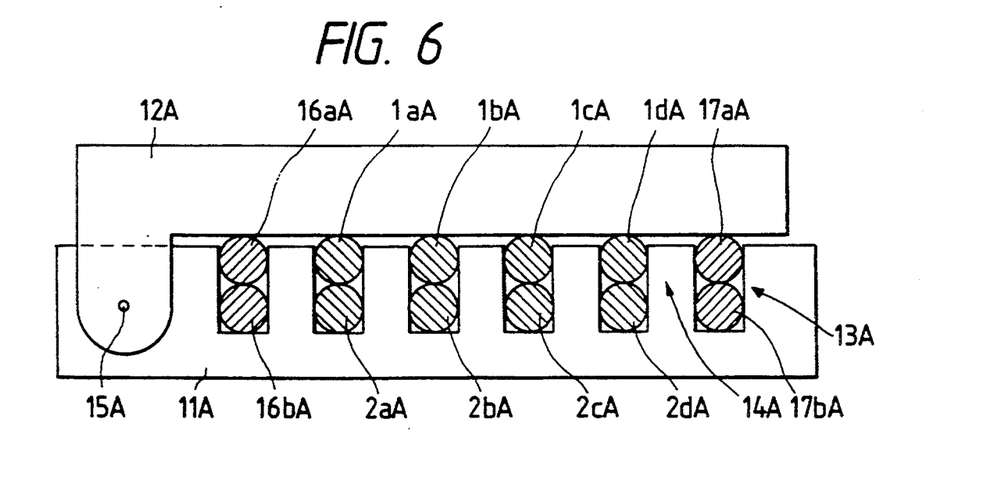
FIG. 6 is a front view schematically illustrating an optical fiber strand fixing jig used in an embodiment of the present invention.

FIG. 6 is a front view illustrating the schematic structure of an example of an optical fiber strand fixing jig similar to that illustrated in FIG. 3. In the drawing, parts similar to those in FIG. 3 are referenced correspondingly, and description about them will be omitted. The reference numerals 16aA, 16bA, 17aA and 17bA represent rectifier rods, the sections of which are illustrated in the same manner as optical fiber strands 1aA to 1dA and 2aA to 2dA. That is, the quartz glass rods 16aA and 16bA each having an outer diameter of 125 μm were disposed as rectifier rods on the opposite sides of the optical fiber strands 1aA to 1dA of the first tape-like optical fiber unit, and the quartz glass rods 17aA and 17bA each having an outer diameter of 125 μm were disposed as rectifier rods on the opposite sides of the optical fiber strands 2aA to 2dA of the second tape-like optical fiber unit. The rectifier rods 16aA, 16bA, 17aA and 17bA were fixed to groove portions 13A of optical fiber strand fixing jigs. According to FIGS. 1 and 2, the rectifier rods are fixed by the optical fiber strand fixing jigs 8aA and 8bA.

As described with reference to FIGS. 1 and 2, the optical fiber strands 1aA to 1dA and 2aA to 2dA were heated by the gas burner 4A to thereby carry out welding and elongating operation. An LD light source of wave length of 0.85 μm had been connected to one end of the optical fiber 5aA, and photodetectors had been connected to the other-side ends of the optical fibers 5aA and 6aA. Elongating was stopped when the respective intensities of light emitted from the optical fibers 5aA and 6aA became equal to each other. The degree of coupling in each of the thus obtained four optical fiber couplers was in the range of 50±2%, and the uniform characteristics could be confirmed.

In this embodiment, glass rods having the same structure as optical fibers are used as rectifier rods, and these glass rods are also welded and elongated in the same manner as the optical fibers. In this embodiment, optical fibers per se can be used as rectifier rods.

As is apparent from the above description, according to the present invention, it is possible to produce a plurality of optical fiber couplers of the same characteristics through one-time welding and elongation. Consequently, the productivity of optical fiber couplers is improved.

Figure 10:
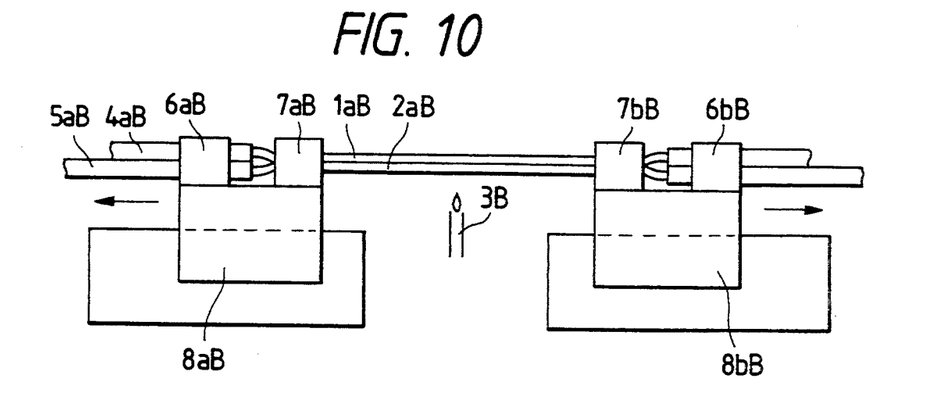
FIG. 10 is a side view of an apparatus for producing optical fiber couplers, for use in an embodiment of a method of producing optical fiber couplers according to the present invention.
Figure 11:
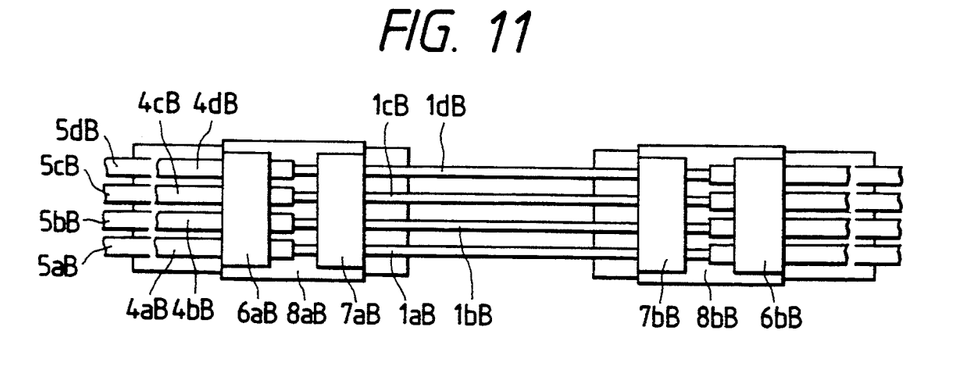
FIG. 11 is a plan view of an apparatus for producing optical fiber couplers, for use in an embodiment of a method of producing optical fiber couplers according to the present invention.

FIGS. 10 and 11 are respectively side and plan views of a schematic arrangement diagram of an apparatus for producing optical fiber couplers, for use in another embodiment of the method of producing optical fiber couplers according to the present invention. Reference numerals 1aB to 1dB and 2aB to 2dB represent optical fiber strands, 3B a gas burner, 4aB to 4dB and 5aB to 5dB optical fibers, 6aB and 6bB optical fiber fixing jigs, 7aB and 7bB optical fiber strand fixing jigs, and 8aB and 8bB elongating tables. The optical fiber strands 2aB to 2dB are disposed under the optical fiber strands 1aB to 1dB so that they are not shown in FIG. 11.

The first and second optical fibers 4aB to 4dB and 5aB to 5dB are fixed, by the optical fiber fixing jigs 6aB and 6bB, to the elongating tables 8aB and 8bB so that they are parallel with each other with intervals therebetween. Further, the optical fiber strands 1aB to 1dB obtained by removing the coating of the first optical fibers and the optical fiber strands 2aB to 2dB obtained by removing the coatings of the second optical fibers are fixed, by the optical fiber strand fixing jigs 7aB and 7bB, so as to be in contact tightly with each other. The gaps between the optical fiber strands 1aB - 1dB and 2aB - 2dB are fixed such that a heating gas flow flows uniformly through the gaps between the optical fiber strands as described above.

In this state, the optical fiber strands 1aB to 1dB and 2aB to 2dB are heated by use of the gas burner 3B so that 1aB and 2aB, 1bB and 2bB, 1cB and 2cB, and 1dB and 2dB are welded integrally with each other, respectively. Thereafter, the integrated optical fiber strands 1aB and 2aB, 1bB and 2bB, 1cB and 2cB, and 1dB and 2dB are heated by use of the gas burner 3B, and the elongating table 9aB is moved left while the elongating table 9bB is moved right to thereby perform elongation. At this time, a laser diode (LD) light source, not shown in the drawing, is connected to one end of the optical fiber 5aB while power meters are connected to the other-side ends of the optical fibers 5aB and 6aB to thereby monitor output lights. The elongating operation is stopped when the intensities of light emitted from the optical fibers 5aB and 6aB become equal to each other. Thus, it is possible to produce four optical couplers at the same time.

Figure 12:
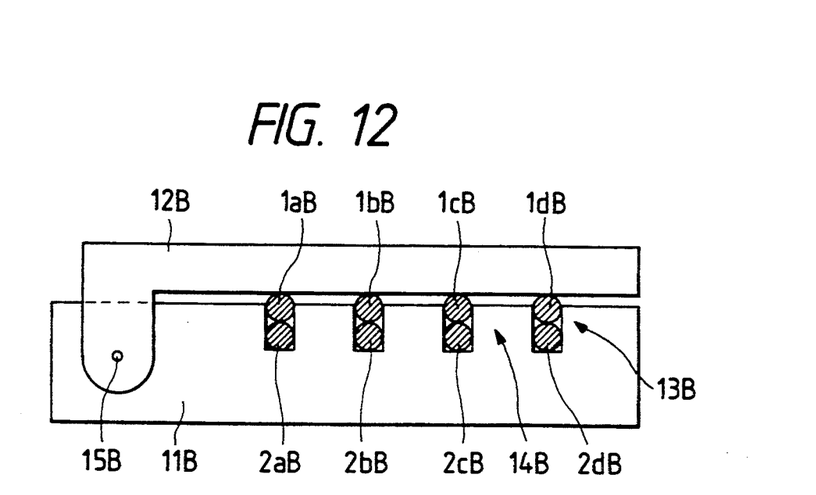
FIG. 12 is a front view schematically illustrating an example of an optical fiber strand fixing jig.

FIG. 12 is a front view illustrating the schematic structure of an example of the optical fiber strand fixing jigs. In the drawing, the reference numeral 11B represents a body member, 12B a pressing member, 13B groove portions, 14B spacer portions, and 15B a pivot. The optical fiber strands 1aB to 1dB and 2aB to 2dB accommodated in the groove portions 13B are shown in section. The groove portions 13B in the body member 11B are formed with spacer portions 14B so that a heating gas flow flows uniformly through each of the gaps between the optical fiber strands. For example, if the outer diameter of each of optical fiber protective coatings is 250 μm, and the diameter of each of the optical fiber strands is 125 μm, the width of each of the groove portions 13B is selected to be 125 μm, and the width of each of the spacer portions 14B between the groove portions is selected to be 250 μm in order to make each of the gaps between the optical fiber strands be 250 μm. The groove portions 13B may be formed by cutting the body member 11B, or the spacer portions may be formed by burying piano wires in an upper surface of the body member 11B which is made plane. When two optical fiber strands are accommodated in each groove portion 13B, the pressing member 12B is turned down around the pivot 15B so as to press and fix the optical fiber strands from the upside.

Figure 13:
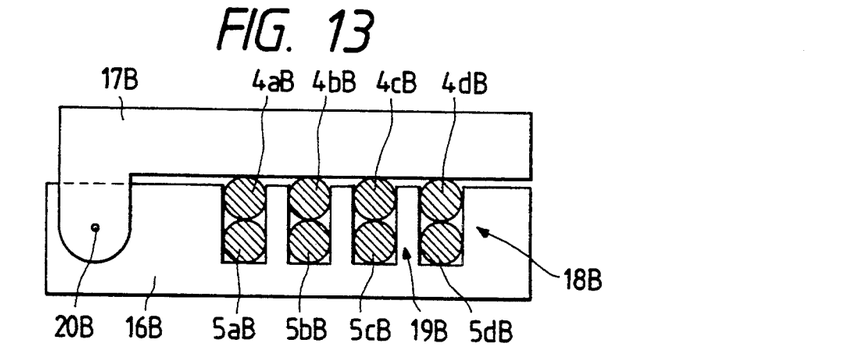
FIG. 13 is a front view schematically illustrating an example of an optical fiber fixing jig.

FIG. 13 is a front view schematically showing another configuration of a fixing jig. Reference numeral 16B represents a body member, 17B a pressing member, 18B groove portions, 19B spacer portions, and 20B a pivot. The optical fibers 4aB–4dB, and 5aB and 5dB accommodated in the groove portions 18B are shown in section. The groove portions 18B in the body member 16B are formed with the spacer portions 19B at intervals such that the center lines of the respective groove portions coincide with the center lines of the respective groove portions of the optical fiber strand fixing jig. In the above-mentioned case where the outer diameter of the optical fiber protective coating is 250 μm, the diameter of each of the optical fiber strands is 125 μm, and each of the gaps between the optical fiber strands is 250 μm, the width of each of the groove portions 18B is made to be 250 μm and the width of each of the spacer portions 19B between the groove portions is made to be 125 μm. Similarly to the optical fiber strand fixing jig, the groove portions 18B may be formed by cutting the body member 16B, or the spacer portions 19B may be formed by burying piano wires in an upper surface of the body member 16B which is made plane. In a state that two optical fiber strands are accommodated in each groove portion 18B, the pressing member 17B is turned down around the pivot 20B so as to press and fix the optical fibers from the upside.

There will now be described a fourth embodiment in which optical fiber couplers were produced by use of the above-mentioned apparatus for producing optical fiber couplers shown in FIGS. 10 and 11. Single-mode (SM) optical fibers for 1 μm band communication were used as the optical fibers 4aB to 4dB and 5aB to 5dB. Each of the gaps between the optical fiber strands 1aB–1dB and 2aB–2dB was made to be 250 μm. In the elongating operation after welding, an LD light source of a wave length of 1.31 μm was used as a light source for monitoring the ratio of branching, and the elongating operation was stopped when the emitted light intensities became equal to each other, in the same manner as mentioned above. As a result of measuring the degree of coupling upon the obtained optical fiber couplers 1aB–2aB, 1bB–2bB, 1cB–2cB and 1dB–2dB on the basis of the wave length 1.31 μm, each optical fiber coupler had the degree of coupling of 50±2%, so that it was possible to produce optical fiber couplers having uniform characteristics.

Optical fibers are not limited to single-core optical fibers. Tape-like optical fibers may be used as one or both of the optical fiber group 1aB to 1dB and the optical fiber group 2aB to 2dB.

In a fifth embodiment, tape-like four (4)-core optical fiber units were used as optical fibers so as to produce four optical fiber couplers en bloc. The coated optical fibers used in the tape-like optical fiber units were optical fibers for 1 μm band communication. FIG. 16 is a sectional view of the tape-like four-core optical fiber unit. The outer diameter of each optical fiber strand constituted by a core 21B and a clad 22B is 125 μm and the outer diameter of the coated optical fiber obtained by covering the optical strand with a protective coating 23B. The coated optical fibers are arranged in plane at intervals of 375 μm and covered with a coating layer 24B so as to make the coated optical fibers integrated flatly. Accordingly, each gap between the coating layers is 125 μm, and each gap between the clads is 250 μm.

As to the first tape-like optical fiber unit, after coating was removed, the four optical fiber strands 1aB to 1dB each having an outer diameter of 125 μm were etched so as to reduce the outer diameter by use of a 10% fluoric acid solution so that the outer diameter becomes 115 μm. The optical fiber strands 2aB to 2dB of the second tape-like optical fiber unit were not subjected to etching so that they were left as they were in a condition where the coating was removed. These first and second tape-like optical fiber units were fixed by use of the optical fiber fixing jigs 6aB and 6bB, and the upper and lower optical fiber strands were tightly contacted and fixed by use of the optical fiber fixing jigs 7aB and 7bB.

Heat elongating operation was carried out by moving the elongating table 8aB left and the elongating table 8bB right after the integrated optical fiber strands 1aB to 1dB and 2aB to 2dB were heated by use of the gas burner 3B. At this time, an LD light source of a wave length of 1.31 μm was connected to one end of the optical fiber 4aB, an LD light source of a wave length of 1.55 μm was connected to one end of the optical fiber 5bB, and power meters were connected to the otherside ends of the optical fibers 5aB, 5bB, 6aB and 6bB respectively. The outputs of the power meters were measured, and the elongating operation was stopped when $$\frac{INT5}{INT5 + INT6} = \frac{INT7}{INT7 + INT8}$$

where INT5=the intensity of light emitted from the optical fiber 4aB; INT6=the intensity of light emitted from the optical fiber 5aB; INT7=the intensity of light emitted from the optical fiber 4bB; and INT8=the intensity of light emitted from the optical fiber 5bB.

The degree of coupling was measured upon the thus obtained four optical fiber couplers 1aB-2aB, 1bB-2bB, 1cB-2cB, and 1dB-2dB. Each optical fiber coupler had the degree of coupling 50±2% at the wave length of 1.31 μm, and also 50±2% at the wave length of 1.55 μm. Thus, it could be confirmed that they showed uniform characteristics in each wave length.

The optical fiber couplers produced in the fifth embodiment were wide band optical fiber couplers, the degrees of coupling of which were equal with respect to the wave lengths 1.31 μm and 1.55 μm. Conventionally, in the elongating operation of such optical fiber couplers, it has been necessary to connect a plurality of light sources and photodetectors, by use of a combining/branching filter, to one optical fiber because elongating operation has been carried out while monitoring light at a plurality of wave lengths at the same time. On the other hand, in the production method according to the present invention, there is an advantage that since optical fiber couplers having the same characteristics can be produced at the same time, the characteristics at a plurality of wave lengths can be monitored without using a combining/branching filter if only a pair of a light source and a photodetector are attached to a plurality of optical fibers, and it is not necessary to constitute a complicated monitor system.

The diameters of optical fiber strands of one of the optical fiber units were reduced by etching in order to make the degree of coupling of optical fiber couplers be wide band in the fifth embodiment. Alternatively, it is possible to apply other generally known methods, such as a method of using optical fibers having different strand diameters, a method of elongating one optical fiber group in advance, a method of using optical fibers having cores different in diameter, a method of using optical fibers having cores different in refractive index, and so on.

Figure 14:
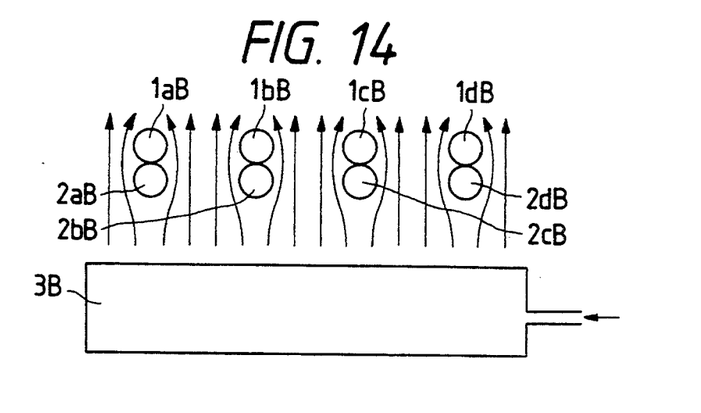
FIG. 14 is a diagram showing heating of the fiber strands.
Figure 15:
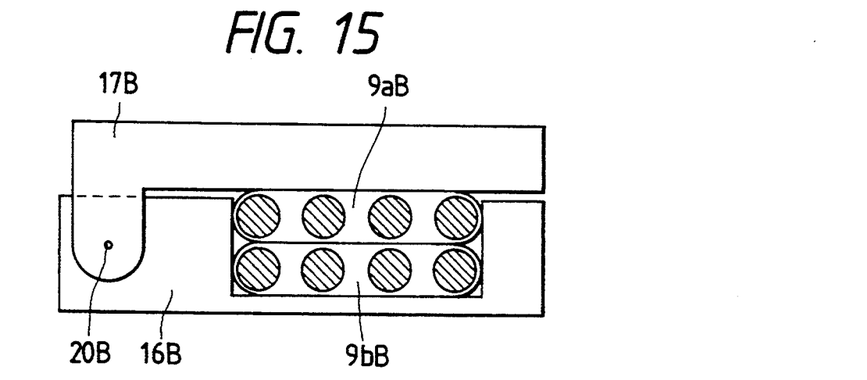
FIG. 15 is a front view schematically illustrating an optical fiber fixing jig used in an embodiment of the present invention.

In a sixth embodiment, optical fiber couplers were produced by the production apparatus shown in FIG. 10 by use of tape-like four-core optical fiber units obtained by making SM optical fibers having cut-off of 0.75 $\mu$m, a strand diameter of 125 $\mu$m, and a coating diameter of 250 $\mu$m into the form-like tapes. Since each tape-like optical fiber unit has a usual tape-like optical fiber structure in this embodiment, it is necessary to widen each interval between optical fiber strands in the portion in which the coating is removed to 250 $\mu$m. Therefore, after each tape-like optical fiber unit before and after the portion in which the coating had been removed was separated into single-core optical fibers, the separated single-core optical fibers were arranged by use of the optical fiber fixing jigs 6$a$B and 6$b$B and the optical fiber strand fixing jigs 7$a$B and 7$b$B, and then welding and elongating operations were performed. The optical fiber fixing jigs are similar to those which were described in FIG. 13, and the optical fiber strand fixing jigs are similar to those which were described in FIG. 12. FIG. 14 is a diagram showing heating of the fiber strands. FIG. 15 is a front view schematically illustrating an optical fiber fixing jig that is suitable.

As shown in FIG. 14, for example, heating operation is carried out in a condition that the first optical fiber strands 1$a$B–1$d$B and the second optical fiber strands 2$a$B 2$d$B are arranged so that the gaps between the first optical fiber strands 1$a$B–1$d$B and the second optical fiber strands 2$a$B–2$d$B allow a heating gas flow to uniformly flow through the gaps. Accordingly, the gas flow flows between the optical fiber strands to make it possible to heat all the optical fiber strands uniformly so that optical couplers having the same characteristics can be obtained. The intervals of the optical fiber strands may be selected so as to form gaps between alternate optical fiber strands so that the gaps allow the heating gas flow to flow uniformly therethrough.

These rectifier rods may be used in the elongating operation as well as in the welding operation, so that it is possible to elongate optical fibers while maintaining a uniform temperature.

By using a tape-like multi-core optical fiber unit (ribbon fiber) as at least one of the first and second optical fiber groups, it is possible to easily arrange the fibers as necessary. In this case, as the tape-like multi-core optical fiber unit (ribbon fiber), a method of using a tape-like optical fiber unit in which optical fiber strands are formed so that each of the gaps therebetween is 250 $\mu$m or more and a method in which a tape-like optical fiber unit having an ordinary structure is used and the optical fibers only at the portion where the coating is removed are separated from each other so as to be single-core optical fibers and arranged so that each of the gaps therebetween is 250 $\mu$m or more are advantageous.

In the elongating operation, an LD light source of wave length 0.85 $\mu$m was connected to one end of an optical fiber 4$a$B, and light power meters were connected with the other side ends of the optical fibers 4$a$B and 5$a$B, so that the elongating operation was performed while the emitted light intensities were monitored, and the elongating operation was stopped when the intensities of light emitted from the respective optical fibers 4$a$B and 5$a$B became equal to each other. The degree of coupling in each obtained optical fiber coupler was 50±2%, and it was confirmed that the couplers had uniform characteristics.

In a seventh embodiment, optical fiber couplers were produced en bloc by the production apparatus shown in FIG. 10 by use of tape-like eight-core optical fiber units as optical fibers. The coated optical fibers used in the tape-like optical fiber units were optical fibers for 1.3 $\mu$m band communication. Since each of the tape-like optical fiber units had a usual structure in this embodiment, each tape-like optical fiber unit was separated into single-core optical fibers at positions before and after the portion in which the coating had been removed, and, then, the separated single-core optical fibers were arranged by use of the optical fiber fixing jigs 6$a$B and 6$b$B and the optical fiber strand fixing jigs 7$a$B and 7$b$B.

The outer diameter of each optical fiber strand of each tape-like eight-core optical fiber unit used in this embodiment was 125 $\mu$m, and the outer diameter of each coated optical fiber obtained by covering each optical fiber strand with a protective coating was 250 $\mu$m. The optical fibers were arranged so that the interval between alternate optical fiber strand was not shorter than 250 $\mu$m, for example, 500 $\mu$m.

Figure 17:
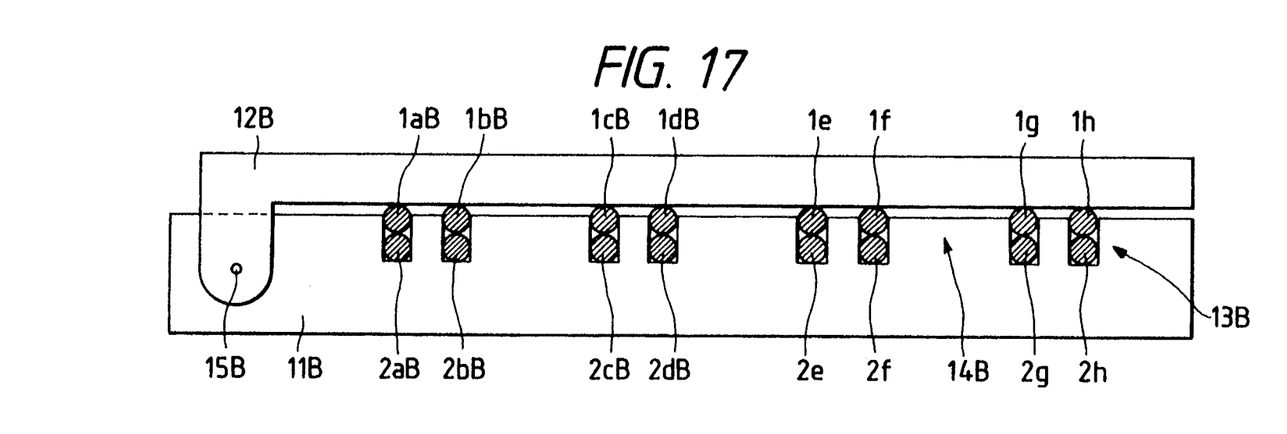
FIG. 17 is a front view schematically illustrating an optical fiber strand fixing jig used in a seventh embodiment of the present invention.
Figure 18:
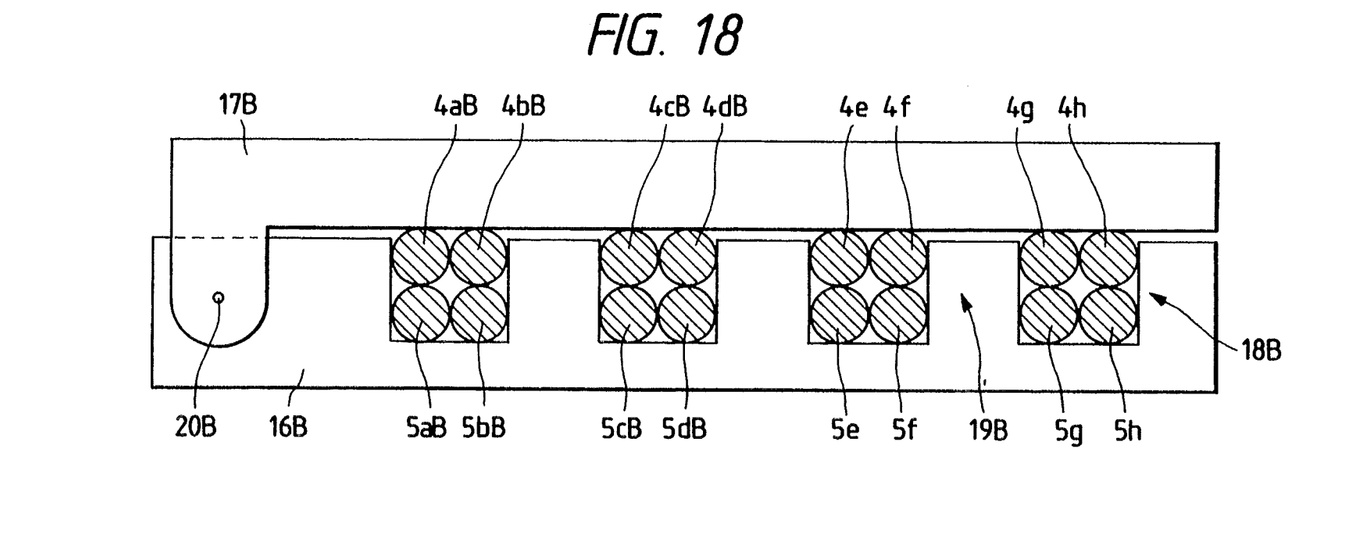
FIG. 18 is a front view schematically illustrating an optical fiber fixing jig used in the seventh embodiment of the present invention.

FIG. 17 is a front view illustrating the schematic structure of an example of the optical fiber strand fixing jig, and FIG. 18 is a front view illustrating the schematic structure of an example of the optical fiber fixing jig. In the drawings, parts equivalent to those in FIGS. 12 and 13 are referenced correspondingly, and their description will be omitted. The coated optical fibers are fixed such that two coated optical fibers are arranged with their coatings contacting with each other, the next two coated optical fibers are arranged with their coatings contacting with each other, and the same rule applies correspondingly to the following is applies. Accordingly, the gap between the two optical fiber strands of every two optical fibers with their coatings contacting with each other is 125 $\mu$m. The distance between the center lines of adjacent two optical fibers with their coatings separated from each other is 625 $\mu$m and the gap between the respective coatings of adjacent two optical fibers with their coatings separated from each other is 375 $\mu$m. Accordingly, the gap between the respective optical fiber strands of adjacent two optical fibers with their coatings separated from each other is 500 $\mu$m.

In this state, welding and elongating operations were performed. In the elongating step, an LD light source of wave length 1.55 $\mu$m was connected to one end of an optical fiber 4$a$B, and power meters were connected to the other side ends of the optical fibers 4$a$B and 5$a$B, so that the elongating operation was performed while the emitted light intensities were monitored, and the elongating operation was stopped when the intensities of light emitted from the respective optical fibers 4aB and 5aB became equal to each other. As a result of measurement of the degree of coupling at the wave length of 1.55 μm on the thus obtained eight optical fiber couplers, the degree of coupling was 50±2% in each optical fiber coupler, and it was confirmed that uniform characteristics could be obtained.

According to the present invention, it is possible to produce a plurality of optical fiber couplers of the same characteristics through one-time welding and elongation. This greatly enhances production efficiency.

What is claimed is:

1. A method for producing optical fiber couplers from a first plurality and second plurality of optical fibers having optical fiber strands and surrounding coating, comprising the steps of:
   exposing a first selected portion of the optical fiber strands of the first plurality of optical fibers by removing the coating surrounding the first selected portion of the optical fiber strands and aligning the first selected portion of the optical fiber strands in relation to each other along a direction perpendicular to a longitudinal direction of the first plurality of optical fibers;
   arranging the optical fiber strands of the first plurality of optical fibers in parallel and co-planar relationship to each other so as to form a first optical fiber group;
   exposing a second selected portion of the optical fiber strands of the second plurality of optical fibers by removing the coating surrounding the second selected portion of the optical fiber strands and aligning the second selected portion of the optical fiber strands in relation to each other along a direction perpendicular to a longitudinal direction of the second plurality of optical fibers;
   arranging the optical fiber strands of the second plurality of optical fibers in parallel and co-planar relationship to each other so as to form a second optical fiber group;
   arranging the fibers of the first and second optical fiber groups such that the fibers of the first optical fiber group are in tight contact with corresponding fibers of the second optical fiber group;
   placing rectifier rod members on opposing sides of the first and second optical fiber groups;
   heating and welding the first and second optical fiber groups to one another using a gas burner to form weld portions; and
   elongating the welded portions while further heating to concurrently produce a plurality of optical fiber couplers.

2. A method according to claim 1, further comprising the step of removing the rod members before the step of elongating.

3. A method according to claim 1, further comprising the step of propagating light through the fibers during the step of elongating and measuring an amount of light emerging from the fibers for determining when to cease the step of elongating.

4. A method according to claim 1, wherein the rod members are comprised of quartz glass.

5. A method according to claim 1, wherein at least one of said first and second optical fiber groups is a tape-like multi-core optical fiber unit in which a plurality of optical fibers are formed integrally with a protective coating.

6. A method according to claim 5, wherein both of said first and second optical fiber groups are tape-like multi-core optical fiber units in which a plurality of optical fibers are formed integrally with a protective coating.

7. A method for producing optical fiber couplers from a first plurality and second plurality of optical fibers having optical fiber strands and surrounding coating, comprising the steps of:
   exposing a first selected portion of the optical fiber strands of the first plurality of optical fibers by removing the coating surrounding the first selected portion of the optical fiber strands and aligning the first selected portion of the optical fiber strands in relation to each other along a direction perpendicular to a longitudinal direction of the first plurality of optical fibers;
   arranging the optical fiber strands of the first plurality of optical fibers in parallel and co-planar relationship to each other so as to have gaps therebetween to allow a heating gas to flow therethrough so as to form a first optical fiber group;
   exposing a second selected portion of the optical fiber strands of the second plurality of optical fibers by removing the coating surrounding the second selected portion of the optical fiber strands and aligning the second selected portion of the optical fiber strands in relation to each other along a direction perpendicular to a longitudinal direction of the second plurality of optical fibers;
   arranging the optical fiber strands of the second plurality of optical fibers in parallel and co-planar relationship to each other so as to form a second optical fiber group;
   arranging the fibers of the first and second optical fiber groups such that the fibers of the first optical fiber group are in tight contact with corresponding fibers of the second optical fiber group;
   placing rectifier rod members on opposing sides of the first and second optical fiber groups;
   heating and welding the first and second optical fiber groups to one another using a gas burner to form weld portions; and
   elongating the welded portions while further heating to concurrently produce a plurality of optical fiber couplers.

8. A method according to claim 7, further comprising the step of removing the rod members before the step of elongating.

9. A method according to claim 7, further comprising the step of propagating light through the fibers during the step of elongating and measuring an amount of light emerging from the fibers for determining when to cease the step of elongating.

10. A method according to claim 7, wherein the rod members are comprised of quartz glass.

11. A method according to claim 7, wherein at least one of said first and second optical fiber groups is a tape-like multi-core optical fiber unit in which a plurality of optical fibers are formed integrally with a protective coating.

12. A method according to claim 11, wherein both of said first and second optical fiber groups are tape-like multi-core optical fiber units in which a plurality of optical fibers are formed integrally with a protective coating.

13. A method according to claim 7, wherein each of said gaps between optical fiber strands is not smaller than 250 μm.

14. A method according to claim 7, wherein each of said gaps are not smaller than 250 μm.

* * * * *